(12) United States Patent
Kanbe et al.

(10) Patent No.: US 9,011,611 B2
(45) Date of Patent: Apr. 21, 2015

(54) CLEANING APPARATUS AND CLEANING METHOD

(75) Inventors: Kazuhiro Kanbe, Kanagawa (JP); Yousuke Iwamaru, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 313 days.

(21) Appl. No.: 13/539,813

(22) Filed: Jul. 2, 2012

(65) Prior Publication Data

US 2014/0000660 A1    Jan. 2, 2014

(51) Int. Cl.
*B08B 3/04* (2006.01)
*B01D 21/24* (2006.01)
*B01D 17/02* (2006.01)

(52) U.S. Cl.
CPC . *B08B 3/04* (2013.01); *B08B 3/048* (2013.01); *B01D 17/0214* (2013.01); *B01D 21/2433* (2013.01)

(58) Field of Classification Search
CPC .................................................... B08B 3/048
See application file for complete search history.

(56) References Cited

U.S. PATENT DOCUMENTS

| 6,557,569 | B2 * | 5/2003 | Katagiri et al. ............... 134/25.4 |
| 2004/0076912 | A1 * | 4/2004 | Muraoka et al. ............... 430/329 |
| 2009/0120463 | A1 * | 5/2009 | Gray et al. ...................... 134/19 |

FOREIGN PATENT DOCUMENTS

| CN | 101138694 A | | 3/2008 |
| JP | 05061215 A | * | 3/1993 |
| JP | A-2002-370073 | | 12/2002 |
| JP | 2003290724 A | * | 10/2003 |
| JP | A-2003-290724 | | 10/2003 |
| JP | A-2004-66185 | | 3/2004 |
| JP | A-2007-44662 | | 2/2007 |
| JP | A-2010-17705 | | 1/2010 |

OTHER PUBLICATIONS

English Machine Translation of JP 05-61215 A.*
Jul. 2, 2014 Office Action issued in Chinese Application No. 201110104046.4 (with English Translation).

* cited by examiner

*Primary Examiner* — Nicole Blan
(74) *Attorney, Agent, or Firm* — Oliff PLC (57) ABSTRACT

A cleaning apparatus includes a cleaning tank in which an object to be cleaned having oil is immersed, a cleaning water supply device that supplies cleaning water from a lower side of the cleaning tank to the inner portion thereof, a recovery device in which an upper end opening is provided at a position that is lower than a liquid surface of the cleaning water supplied to the cleaning tank, and that recovers the cleaning water overflowed due to the cleaning water supplied to the cleaning tank through the cleaning water supply device and the oil floating on the liquid surface of the cleaning water from the opening, and a contact member that is disposed so that an edge of the liquid surface of the cleaning water contacts therewith, and in which the portion contacting the edge of the liquid surface of the cleaning water is formed of glass.

18 Claims, 7 Drawing Sheets

| | AMOUNT OF OIL [mg/cm²] | ESTIMATION |
|---|---|---|
| BEFORE CLEANING | 70 | — |
| CLEANING WATER CONTAINING SURFACTANT | 6.4 | — |
| WELL WATER 20 °C | 21.5 | BAD |
| WELL WATER 40 °C | 6.9 | GOOD |
| WELL WATER 60 °C | 6.4 | GOOD |

CLEANING APPARATUS AND CLEANING METHOD

CROSS-REFERENCE TO RELATED APPLICATIONS

This application is based on and claims priority under 35 USC 119 from Japanese Patent Application No. 2010-272663 filed Dec. 7, 2010.

BACKGROUND

Technical Field

The present invention relates to a cleaning apparatus and a cleaning method.

SUMMARY

According to an aspect of the present invention, there is provided a cleaning apparatus including: a cleaning tank in which an object to be cleaned having oil stuck to the surface thereof is immersed; a cleaning water supply device that supplies cleaning water from a lower side of the cleaning tank to an inner portion of the cleaning tank; a recovery device in which an upper end opening is provided at a position that is lower than a liquid surface of the cleaning water supplied to the cleaning tank through the cleaning water supply device, and that recovers the cleaning water overflowed due to the cleaning water supplied to the cleaning tank through the cleaning water supply device and the oil floating on the liquid surface of the cleaning water from the opening; and a contact member that is disposed so that an edge of the liquid surface of the cleaning water contacts the contact member, and in which the portion contacting the edge of the liquid surface of the cleaning water is formed of glass.

BRIEF DESCRIPTION OF THE DRAWINGS

Exemplary embodiments of the present invention will be described in detail based on the following figures, wherein.

DETAILED DESCRIPTION

An example of a cleaning apparatus and a cleaning method according to an exemplary embodiment of the present invention will be described with reference to FIGS. 1 to 7. Moreover, an arrow UP in the drawings shows an upper side in a vertical direction.

Object to be Cleaned 20

For example, as a material of a cylindrical object to be cleaned 20, there may be metal such as copper, aluminum, nickel, or iron, or alloy thereof, and the like.

As an example, pretreatment such as etching, anodic oxidation, rough cutting, centerless grinding is performed to the object to be cleaned 20, and generally, the object to be cleaned 20 is mirror-cut. Alternatively, the surface of the object to be cleaned 20 becomes a non-mirror surface for the purpose of preventing interference fringes or the like, or roughening processing is preformed to the surface of the object to be cleaned 20 for applying unevenness. At this time, oil or metal chips may be stuck to the surface of the object to be cleaned 20.

Cleaning Apparatus (Overall Configuration)

Figure 1:
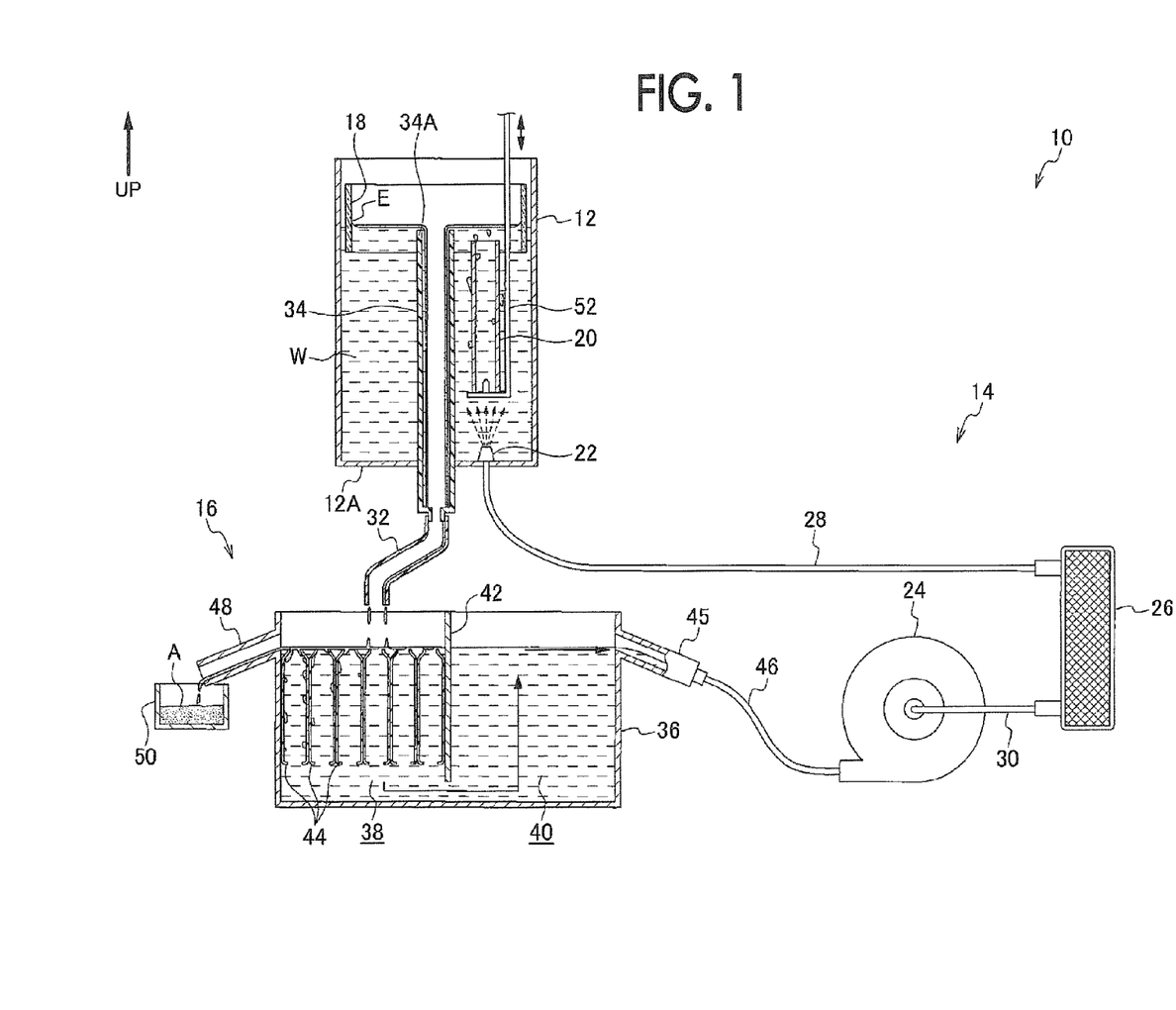
FIG. 1 is a configuration diagram showing a cleaning apparatus according to an exemplary embodiment of the present invention.

As shown in FIG. 1, a cleaning apparatus 10 is configured to include: a cylindrical cleaning tank 12 in the inner portion of which cleaning water W is stored and the cylindrical object to be cleaned 20 having oil A stuck to the surface thereof is immersed; a cleaning water supply device 14 which supplies the cleaning water W to the inner portion of the cleaning tank 12 from the lower side (lower portion) of the cleaning tank 12; and a recovery device 16 which recovers the cleaning water W overflowed from the cleaning tank 12 due to the cleaning water W supplied to cleaning tank 12 through the cleaning water supply device 14.

Cleaning Tank

The cleaning tank 12 is made of a metal such as stainless steel and is formed in a cylindrical shape having a bottom plate 12A, and the cleaning water W is supplied to and stored in the inner portion of the cleaning tank 12.

Moreover, a glass ring 18, which is an example of a contact member formed of glass so as to contact an edge E of the liquid surface of the cleaning water W along the inner circumferential surface of the cleaning tank 12, is provided in the cleaning tank 12. That is, the edge E of the liquid surface of the cleaning water W is a portion which contacts the inner circumferential surface of the glass ring 18 on the liquid surface of the cleaning water W.

In addition, a chuck 52, which is an example of a holding member holding the cylindrical object to be cleaned 20, is provided in the cleaning apparatus 10, and by moving the chuck 52 up and down, the object to be cleaned 20 may be immersed into the cleaning water W of the cleaning tank 12 or may be lifted from the cleaning tank 12. Moreover, the glass ring 18, the chuck 52, and the like will be described in detail below.

Cleaning Water Supply Device

The cleaning water supply device 14 which supplies the cleaning water W to the cleaning tank 12 is configured to include: a nozzle 22 which is mounted to the bottom plate 12A of the cleaning tank 12 and ejects the cleaning water W supplied to the inner portion of the cleaning tank 12; a pump 24 which feeds the cleaning water W to the nozzle 22; and a filter 26 which is provided between the nozzle 22 and the pump 24 and removes dust or the like from the cleaning water W supplied to the cleaning tank 12. In addition, the nozzle 22 and the filter 26 are connected to each other through a hose 28, and the filter 26 and the pump 24 are connected to each other through a hose 30.

Figure 2:
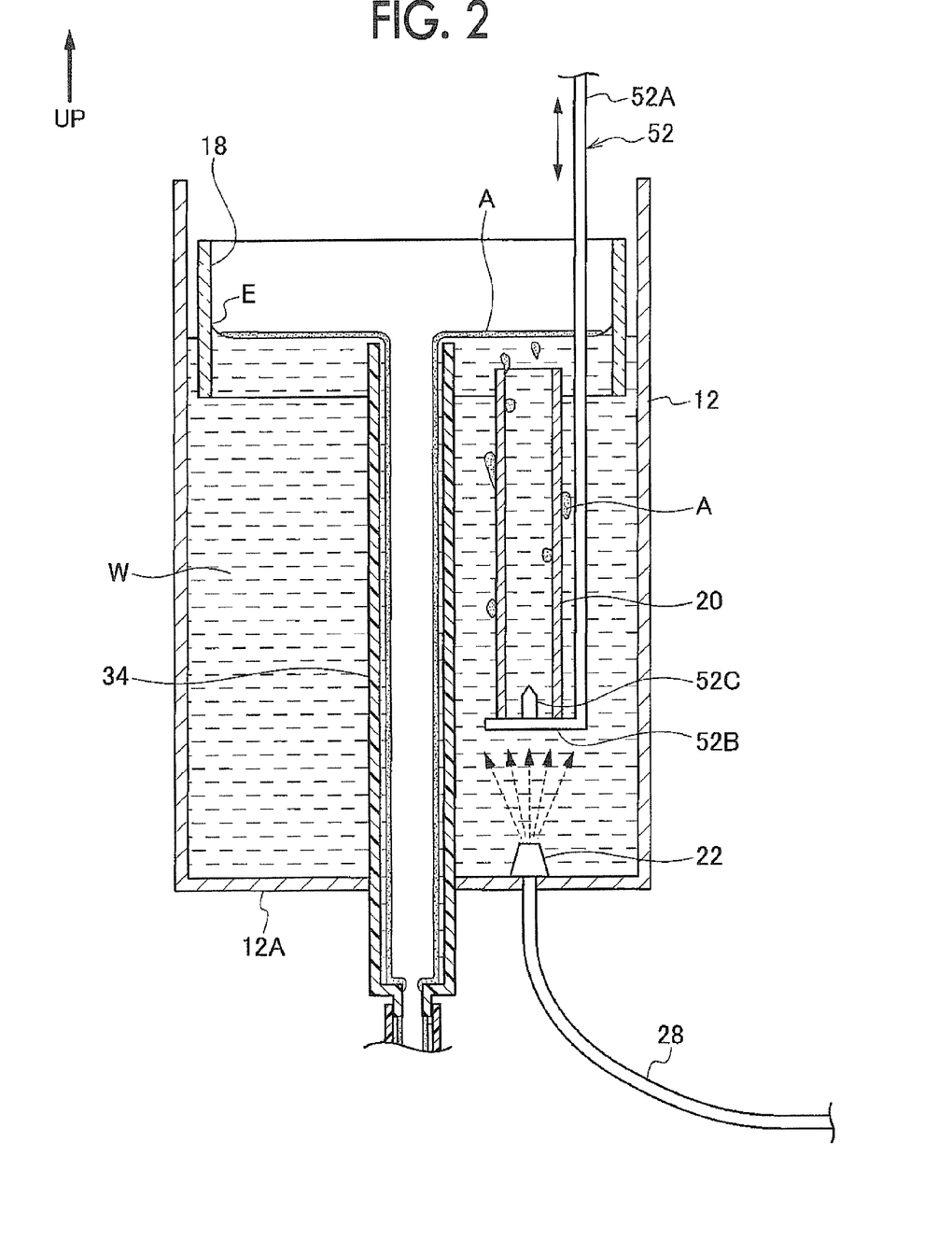
FIG. 2 is a front view showing a cleaning tank which is used in the cleaning apparatus according to the exemplary embodiment of the present invention.

According to the above-described configuration, as shown in FIG. 2, through the flow of the cleaning water W generated due to the cleaning water W ejected from the nozzle 22, separating of the oil A, which is stuck to the surface of the object to be cleaned 20 immersed into the cleaning tank 12, from the object to be cleaned 20 is promoted. Therefore, the oil A floats on the liquid surface of the cleaning water W. In addition, in order to promote the separating of the oil A from the object to be cleaned 20, as shown in FIGS. 1 and 2, the nozzle 22 may be provided just below the object to be cleaned 20, and the flow of the cleaning water W generated due to the cleaning water W ejected from the nozzle 22 may be directly applied to the object to be cleaned 20.

Recovery Device

In the recovery device 16 which recovers the cleaning water W overflowed due to the cleaning water W supplied to the cleaning tank 12 and the oil A floating on the liquid surface of the cleaning water W, a cylindrical recovery pipe 34 is provided in which an upper end opening 34A is disposed on a position which is lower than the liquid surface of the cleaning water W supplied to the cleaning tank 12, and which extends in a vertical direction and is formed of acrylic or the like. Here, the opening 34A is disposed at the center of the cleaning tank 12 viewed from above.

Figure 6:
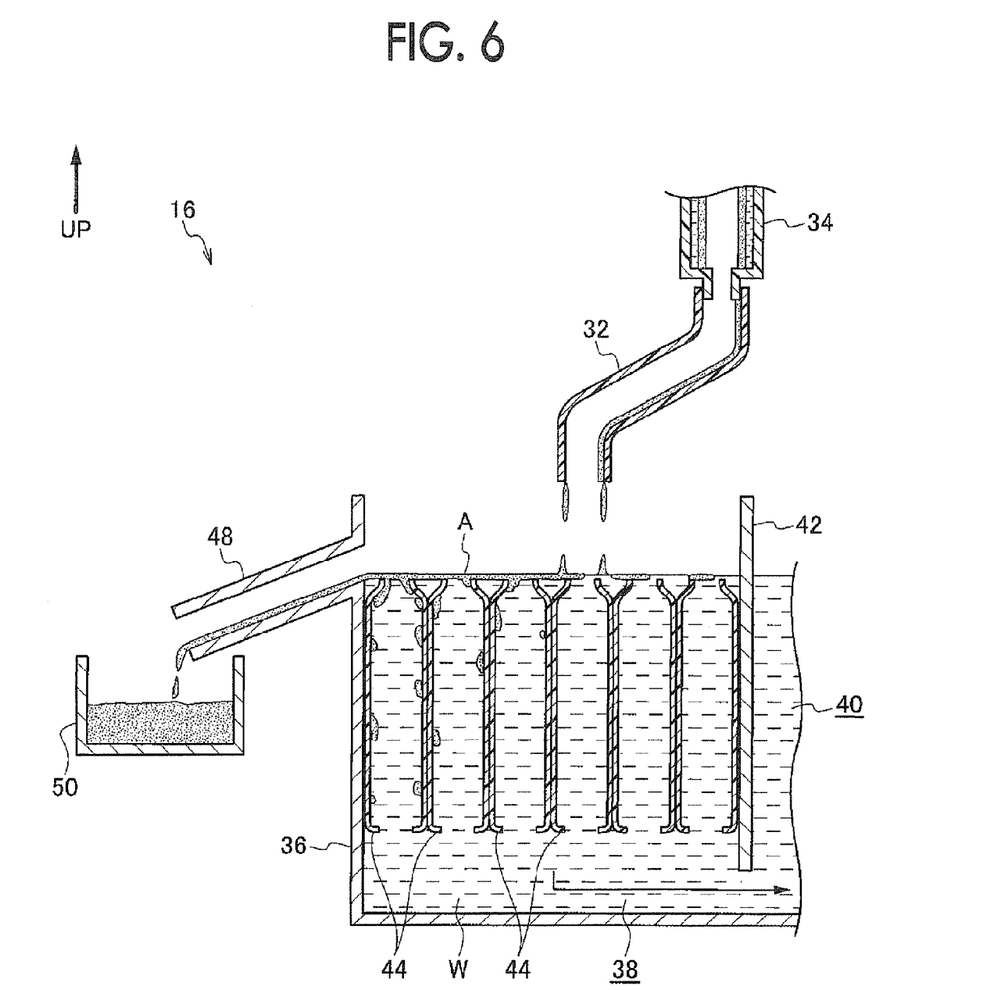
FIG. 6 is a front view showing a recovery device which is used in the cleaning apparatus according to the exemplary embodiment of the present invention.

In addition, as shown in FIGS. 1 and 6, a recovery tank 36 for storing the cleaning water W and the oil A which is recovered through the recovery pipe 34 is provided in the recovery device 16.

The recovery tank 36 includes a first storage portion 38 into which the cleaning water W or the like recovered from the recovery pipe 34 flows through the hose 32, and a second storage portion 40 which is partitioned with the first storage portion 38 by a wall 42 and stores the cleaning water W sucked into the above-described pump 24. In addition, the first storage portion 38 and the second storage portion 40 are connected to each other at the lower end of the wall 42.

Moreover, plural removal members 44 having a cylindrical shape which are formed of polyethylene terephthalate, to which oil is more easily stuck than the water (has high oleophilic), are provided in the first storage portion 38, each of the removal members 44 is disposed so as to extend in the vertical direction, and the removal members are arranged in a horizontal direction. Moreover, in the present exemplary embodiment, holes are drilled in the bottoms of the commercially available PET bottles, and the PET bottles are used as the removal members 44.

Moreover, in above upper ends of the removal members 44, a base end of a drain pipe 48, which drains the oil A floating on the liquid surface of the cleaning water W flowed into the first storage portion 38 to the outside of the recovery tank 36, is fixed to the wall surface of the first storage portion 38. In addition, an accumulation tank 50, in which the oil drained from the tip of the drain pipe 48 is accumulated, is provided along with the recovery tank 36.

On the other hand, a delivery pipe 45 to which a base end of a hose 46 is fixed is fixed to the wall surface of the second storage portion 40, and the tip of the hose 46 to which the base end is fixed to the delivery pipe 45 is fixed to the pump 24.

Figure 3:
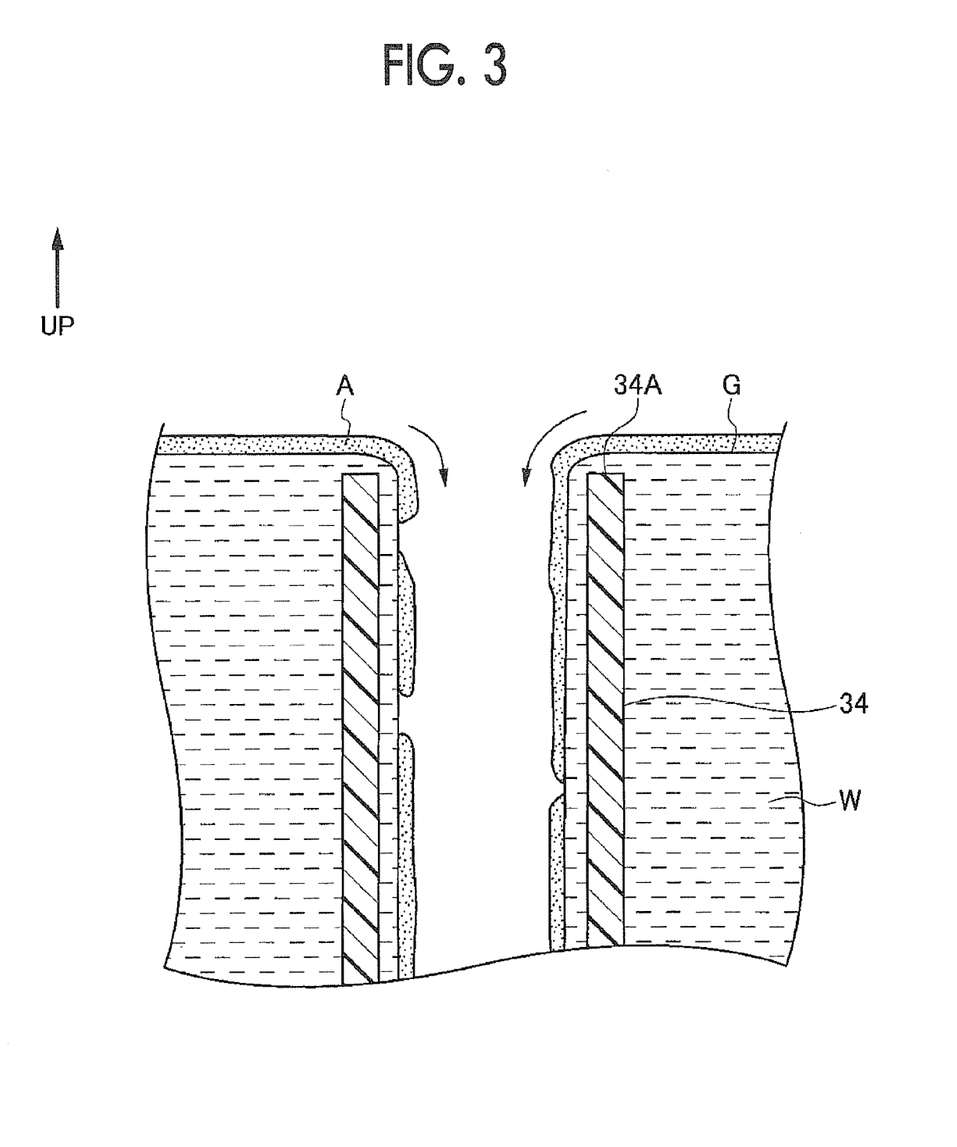
FIG. 3 is a front view (partial enlarged view) showing the cleaning tank which is used in the cleaning apparatus according to the exemplary embodiment of the present invention.

According to the above-described configuration, as shown in FIG. 3, the cleaning water W which is overflowed due to the cleaning water W supplied to the cleaning tank 12 and the oil A which floats on the liquid surface of the cleaning water W flow into the recovery pipe 34 from the opening 34A. In addition, as shown in FIG. 6, the oil A flowing into the first storage portion 38 through the recovery pipe 34 is temporarily stuck to the removal members 44 during flowing from the upper portion of the first storage portion 38 toward the lower portion of the first storage portion 38. The oil A temporarily stuck to the removal members 44 is separated from the removal members 44, floats on the liquid surface of the first storage portion 38, and is accumulated in the accumulation tank 50 through the drain pipe 48.

Next, the glass ring 18 provided in the inner portion of the cleaning tank 12, the chuck 52 holding the object to be cleaned 20, or the like will be described.

Glass Ring 18

As shown in FIG. 2, the glass ring 18 is provided along the inner circumferential surface of the cleaning tank 12, is formed in a ring shape, and is fixed to the cleaning tank 12 by a fixture (not shown).

In addition, the edge E of the liquid surface of the cleaning water W stored in the cleaning tank 12 contacts the inner circumferential surface of the glass ring 18. That is, the opening 34A is disposed between the upper end and lower end of the glass ring 18.

Figure 4:
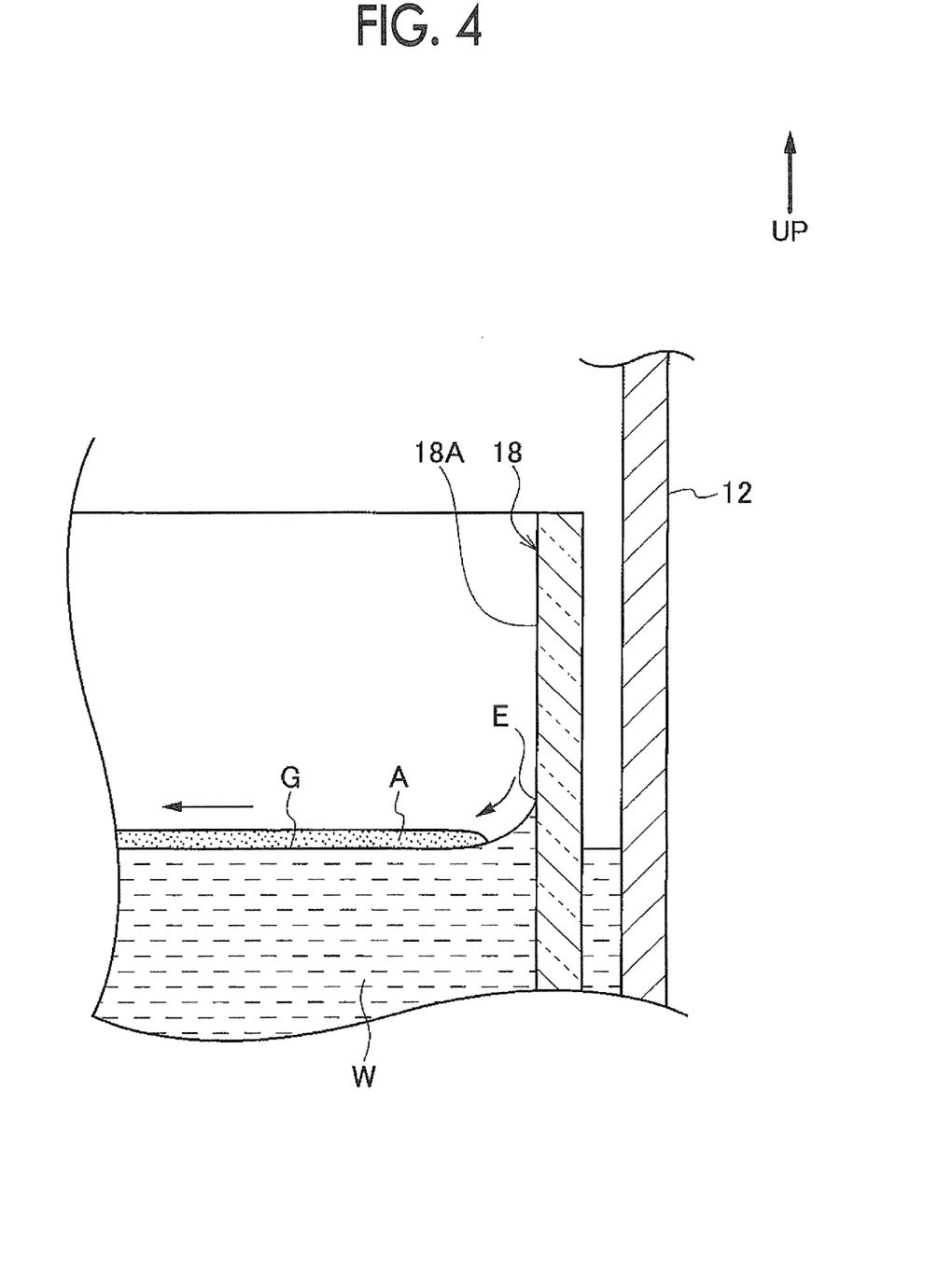
FIG. 4 is a front view (partial enlarged view) showing the cleaning tank which is used in the cleaning apparatus according to the exemplary embodiment of the present invention.

As shown in FIG. 4, the edge E of the liquid surface of the cleaning water W contacting the glass ring 18 is higher compared to a general portion G of the liquid surface in the vertical direction due to a balance of a surface tension between an inner circumferential surface 18A of the glass ring 18 and the cleaning water W and a surface tension between the inner circumferential surface 18A of the glass ring 18 and air. Moreover, as shown by an arrow, the oil A which floats on the liquid surface of the cleaning water W is distanced from the inner circumferential surface of the glass ring 18. In other words, in order to make the edge E higher than the general portion G of the liquid surface in the vertical direction, the glass ring 18 molded from glass is used.

Figure 5:
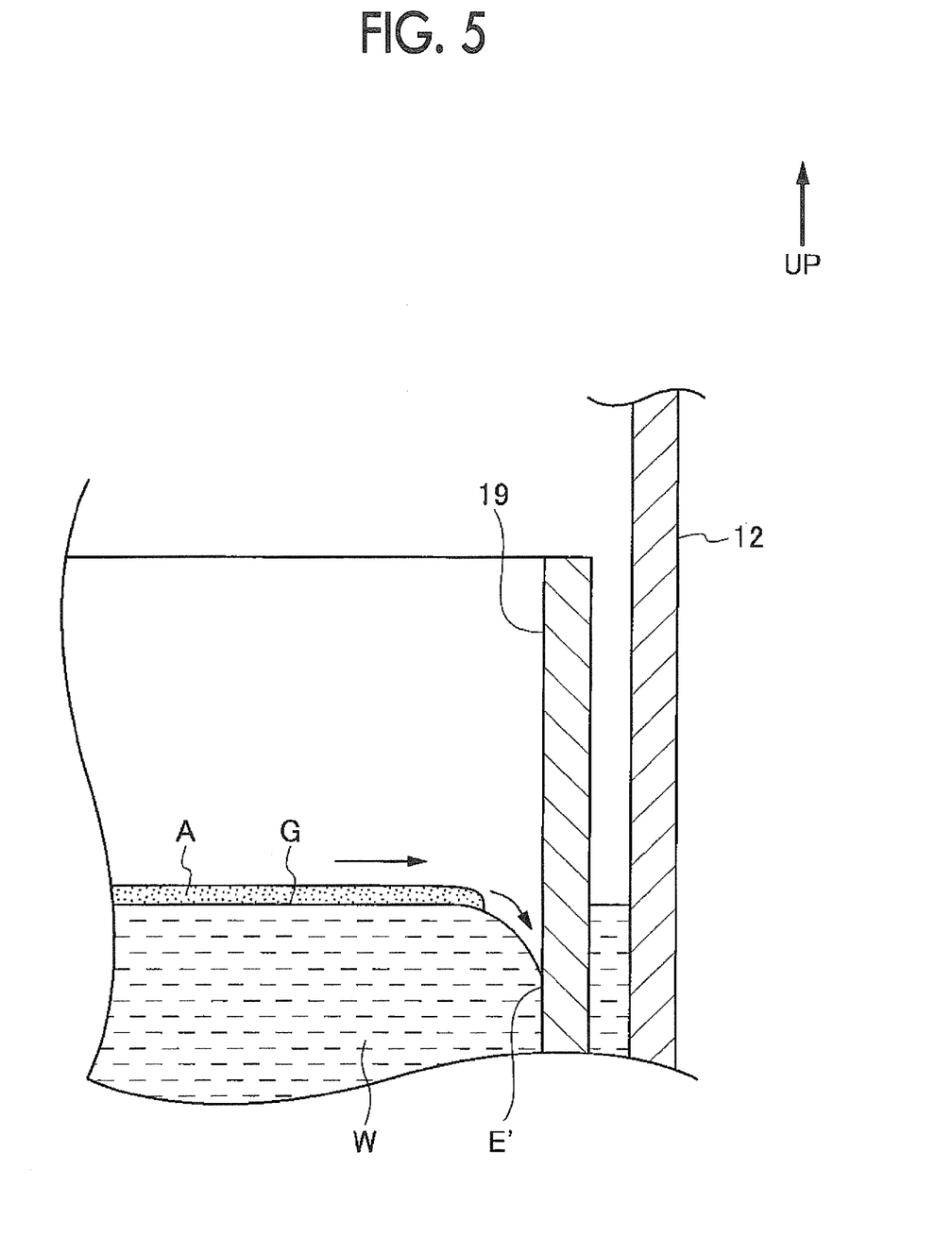
FIG. 5 is a front view (partial enlarged view) showing a cleaning tank which is shown for comparison with the cleaning tank used in the cleaning apparatus according to the exemplary embodiment of the present invention.

Moreover, as shown in FIG. 5, in a case where an edge E' of the liquid surface of the cleaning water W contacts a stainless steel surface 19, not the glass surface, like the present exemplary embodiment, the edge E' is lower compared to the general portion G of the liquid surface in the vertical direction due to the balance of surface tension between the stainless steel surface 19 and the cleaning water W and surface tension between the stainless steel surface 19 and air. In addition, as shown by an arrow, the oil A which floats on the liquid surface of the cleaning water W approaches the stainless steel surface 19 and is stuck to the stainless steel surface 19. Thereby, since the oil A stuck to the stainless steel surface 19 is returned to the liquid surface of the cleaning water W again, the oil A which is returned to the liquid surface of the cleaning water W again is reattached to the object to be cleaned 20 when the object to be cleaned 20 is lifted from the cleaning water W Chuck 50

On the other hand, as shown in FIG. 2, the chuck 52 holding the cylindrical object to be cleaned 20 is molded (formed) of glass. Moreover, the chuck 52 includes: a vertical portion 52A which extends in the vertical direction, receives a driving force from a drive portion (not shown), and moves up and down; a mounting portion 52B in which the end is fixed to the lower end of the vertical portion 52A and the object to be cleaned 20 is mounted; and a protrusion 52C which protrudes upward from the mounting portion 52B and suppresses a position deviation of the mounted object to be cleaned 20. Moreover, in order to promote the separating of the oil A from the object to be cleaned 20, the mounting portion 52B may be a mesh, or plural pinholes are provided on the mounting portion 52B. If the mounting portion 52B has this configuration, when the nozzle 22 is provided just below the object to be cleaned 20, the flow of the cleaning water W which is generated due to the cleaning water W ejected from the nozzle 22 may be directly applied to the object to be cleaned 20.

Cleaning Method (Operation)

Next, operation of the cleaning apparatus 10 will be described along with a cleaning method which cleans the object to be cleaned 20 using the cleaning apparatus 10.

As described above, pretreatment such as etching, anodic oxidation, rough cutting, and centerless grinding is performed to the object to be cleaned 20, and generally, the object to be cleaned 20 is mirror-cut. Alternatively, the surface of the object to be cleaned 20 becomes a non-mirror surface for the purpose of preventing interference fringes or the like, or a roughening processing is performed on the surface of the object to be cleaned 20 for applying unevenness. At this time, kerosene (cutting oil) which is an example of oil or metal chips is stuck to the surface of the object to be cleaned 20.

As shown in FIGS. 1 and 2, the object to be cleaned 20 in which the oil A is stuck to the surface is mounted on the mounting portion 52B of the chuck 52. In this state, the chuck 52 moves downward in the vertical direction, and the object to be cleaned 20 is immersed into the cleaning tank 12 in which the cleaning water W is supplied to the inner portion through the cleaning water supply device 14.

Moreover, through the flow of the cleaning water W which is generated due to the cleaning water W ejected from the nozzle 22 by operating the pump 24, the oil A, which is stuck to the surface of the object to be cleaned 20 immersed into the cleaning tank 12, is separated from the object to be cleaned 20 and floats on the liquid surface of the cleaning water W. Here, well water which is warmed to about 40° C. is used as an example of the cleaning water W.

As shown in FIG. 4, the edge E of the liquid surface of the cleaning water W contacting the inner circumferential surface 18A of the glass ring 18 is higher compared to the general portion G of the liquid surface in the vertical direction. Thereby, as shown by the arrow, the oil A which floats on the liquid surface of the cleaning water W is not stuck to the glass ring 18. Moreover, since the surface of the glass ring 18 is smooth, the oil A is immediately separated even though the oil A is stuck to the glass ring 18 for any reason.

As shown in FIG. 3, the cleaning water W which is overflowed due to the cleaning water W supplied to the cleaning tank 12 and the oil A which floats on the liquid surface of the cleaning water W flow into the recovery pipe 34 from the opening 34A of the recovery pipe 34. Here, as described above, since the oil A which floats on the liquid surface of the cleaning water W is not stuck to the inner circumferential surface of the glass ring 18, the oil A which floats on the liquid surface effectively flows into the recovery pipe 34.

As shown in FIGS. 1 and 6, the oil A which flows into the first storage portion 38 of the recovery device 16 through the recovery pipe 34 flows from the upper portion of the first storage portion 38 toward the lower portion of the first storage portion 38. The oil A, which flows from the upper portion of the first storage portion 38 toward the lower portion of the first storage portion 38 along with the cleaning water W, is temporarily stuck to the removal members 44 which are formed of polyethylene terephthalate to which the oil is easily stuck. Moreover, the oil A which is temporarily stuck to the removal members 44 is separated from the removal members 44, floats on the liquid surface of the first storage portion 38, and is accumulated to the accumulation tank 50 through the drain pipe 48.

On the other hand, the cleaning water W passing through the removal member 44 flows into the second storage portion 40 through the lower side of the wall 42. Moreover, the cleaning water W which flows into the second storage portion 40 is sucked into the pump 24 through the hose 46, and the cleaning water W which is sucked into the pump 24 passes through the filter 26 via the hose 30. The cleaning water W, in which dust such as chips is removed due to the fact that the cleaning water passes through the filter 26, is ejected toward the object to be cleaned 20 from the nozzle 22 through the hose 28.

If a time when the object to be cleaned 20 is immersed into the cleaning tank 12 reaches a predetermined time (30 seconds, for example), the chuck 52 moves upward in the vertical direction, the object to be cleaned 20 is lifted from the cleaning tank 12, and the oil A which is stuck to the surface of the object to be cleaned 20 is cleaned.

In this way, through the use of the glass ring 18, the edge E of the liquid surface of the cleaning water W is higher compared to the general portion G of the liquid surface in the vertical direction, and the oil A which floats on the liquid surface is distanced from the inner circumferential surface of the glass ring 18. Thereby, the oil A, which floats on the liquid surface, effectively flows into the recovery pipe 34 and is recovered.

In addition, since the oil A floating on the liquid surface is effectively recovered, it is suppressed for the oil A from being reattached to the object to be cleaned 20 when the object to be cleaned 20 is lifted.

Moreover, since the reattachment of the oil A to the object to be cleaned 20 is suppressed, a frequency of the cleaning of the object to be cleaned 20 is decreased (number of the cleaning tanks is decreased).

Figure 7:
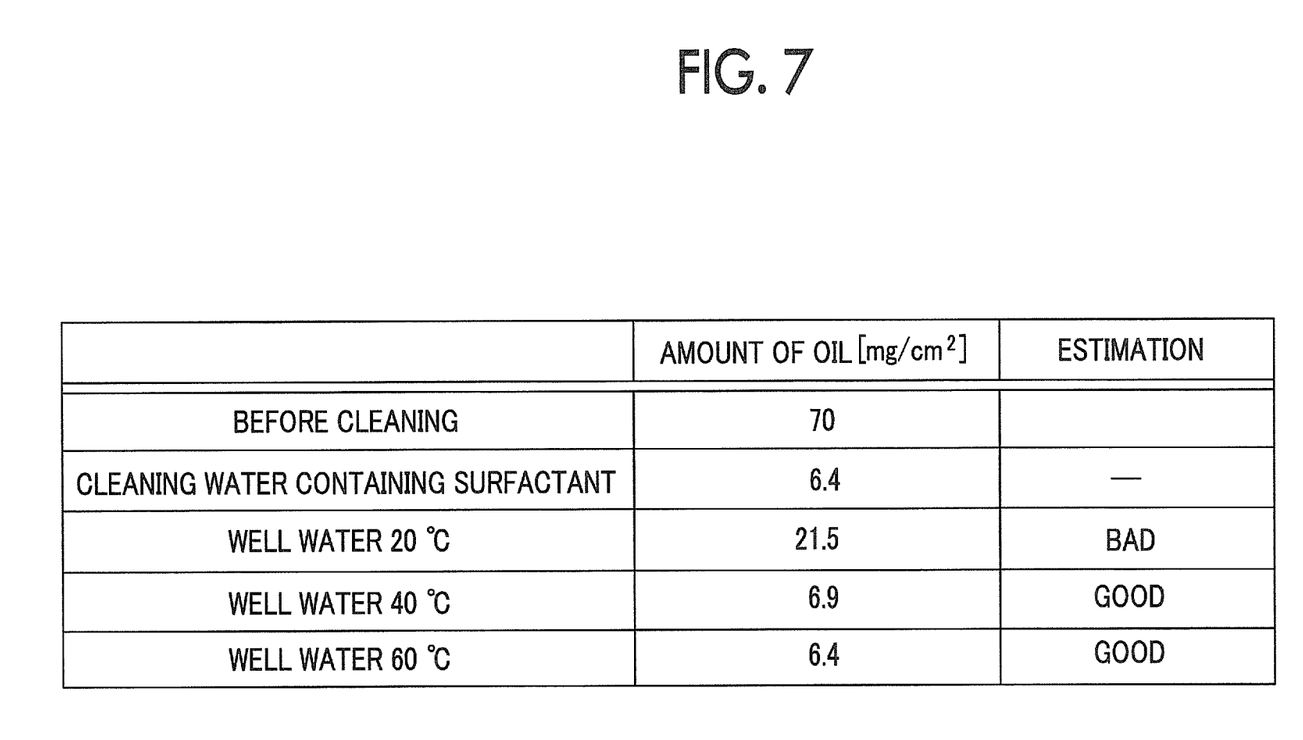
FIG. 7 is a view showing amount of oil remaining in the object to be cleaned which is cleaned by a cleaning method according to an exemplary embodiment of the present invention.

FIG. 7 shows test data at a case where the oil A is kerosene. As shown in FIG. 7, the object to be cleaned 20 is cleaned using well water warmed to about 40° C. (the object to be cleaned 20 is immersed into the cleaning tank 12 for 30 seconds once), and therefore, it is found that about 70 mg/cm$^2$ of the oil A, which is stuck to the object to be cleaned 20 before the object to be cleaned 20 is immersed into the cleaning tank 12 (before the cleaning), becomes about 6.9 mg/cm$^2$.

Similarly, in a case of using the cleaning water containing a surface acting agent, the object to be cleaned 20 is cleaned (the object to be cleaned 20 is immersed into the cleaning tank for 30 seconds 4 to 6 times), and therefore, it is found that about 70 mg/cm$^2$ of the oil A, which is stuck to the object to be cleaned 20 before the cleaning, becomes about 6.4 mg/cm$^2$.

In addition, in a case where the well water of about 20° C. is used, the object to be cleaned 20 is cleaned (the object to be cleaned 20 is immersed into the cleaning tank for 30 seconds once), and therefore, it is found that about 70 mg/cm$^2$ of the oil A, which is stuck to the object to be cleaned 20 before the cleaning, becomes about 21.5 mg/cm$^2$. Moreover, in a case where the well water of about 60° C. is used, the object to be cleaned 20 is cleaned (the object to be cleaned 20 is immersed into the cleaning tank for 30 seconds once), and therefore, it is found that about 70 mg/cm$^2$ of the oil A, which is stuck to the object to be cleaned 20 before the cleaning, becomes about 6.4 mg/cm$^2$.

Here, for example, in a case where suppressing the oil amount after the cleaning to about 7 mg/cm$^2$ or less is the target in order to achieve that the kerosene is not present by the cleaning, evaluation of the well water of about 40° C. and the well water of about 60° C. becomes good.

In addition, measurement of the stuck amount of the oil is preformed using an oil densimeter OCMA-220 (Horiba, Ltd.).

In addition, as the measurement principle of the densimeter, after the oil which is stuck to the object to be measured is extracted (solved) in H-997 (water sample or solvent from the object to be measured), the concentration and the amount of the oil contained in the sample are measured from the changes in the absorption amount of infrared ray in the vicinity of 3.4 to 3.5 μm in the wavelength of the extracted liquid.

As described above, by using the well water of about 40° C. or more, the same oil A compared to the case where the cleaning water containing the surfactant is used is removed from the object to be cleaned 20. Moreover, in this way, by using the well water of about 40° C. or more, since the surfactant does not need compared to the case where the cleaning water containing the surfactant is used, the cleaning cost is reduced (becomes cheaper).

Moreover, since the chuck 52 is molded of glass, it is suppressed for the oil A from being stuck to the chuck 52. Thereby, it is effectively suppressed for the oil A from being reattached to the object to be cleaned 20.

In addition, the removal members 44 remove the oil A from the cleaning water W and the oil A which are recovered through the recovery device 16 and the cleaning water W in which the oil A is removed is supplied to the cleaning tank 12 again. Therefore, the cleaning water W is circulated and the cleaning cost is decreased.

In addition, since the cleaning water W is circulated, the waste liquid is decreased.

Moreover, since the opening 34A of the recovery pipe 34 of the recovery device 16 is disposed at the center of the cleaning tank 12 when viewed from above, compared the case where the opening is deviated from the center, the oil A which floats on the liquid surface is effectively recovered (particularly, in a case where plural objects to be cleaned 20 to be cleaned are cleaned).

In addition, the particular exemplary embodiment of the present invention is described in detail. However, the present invention is not limited to the exemplary embodiment, and it is obvious to those skilled in the art that other various exemplary embodiments are possible within the scope of the present invention.

For example, in the exemplary embodiment, the use of the well water of about 40° C. is described. However, a tap water or the like having a water temperature other than about 40° C. may be used, and the cleaning water or the like containing the surfactant may be used like the related art.

Moreover, in the exemplary embodiment, the glass ring 18 is molded from glass and manufactured. However, the portion contacting the edge E of the liquid surface of the cleaning water W may be formed of glass, and the portion contacting the edge E of the liquid surface may be subjected to a glass coating.

In addition, in the exemplary embodiment, the edge E of the liquid surface of the cleaning water W contacts the glass using the glass ring 18. However, the cleaning tank is molded from glass, and therefore, the edge E of the liquid surface of the cleaning water W may contact the glass.

In addition, although there is no mention in particular in the exemplary embodiment, the cleaning water W of the cleaning tank 12 is vibrated by ultrasonic waves or the like, and the oil may be separated from the object to be cleaned 20.

Moreover, although there is no mention in particular in the exemplary embodiment, the cleaning method according to the present exemplary embodiment may be used when a photoreceptor (electrostatic latent image holding body of an image forming apparatus) is manufactured.

In addition, in the exemplary embodiment, the case where the number of the object to be cleaned 20, the nozzle 22, and the like are one is shown. However, there may be plural objects to be cleaned 20, plural nozzle 22, and the like.

In addition, in the exemplary embodiment, the case where the cylindrical object to be cleaned 20 is used is shown. However, it is needless to say that the present invention is not limited thereto.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cleaning apparatus comprising:
   a cleaning tank for immersing an object to be cleaned, the object having oil stuck to the surface thereof;
   a cleaning water supply device that supplies cleaning water from a lower side of the cleaning tank to an inner portion of the cleaning tank;
   a recovery device in which an upper end opening is provided at a position that is lower than a liquid surface of the cleaning water supplied to the cleaning tank through the cleaning water supply device, and that recovers the cleaning water overflowed due to the cleaning water supplied to the cleaning tank through the cleaning water supply device and the oil floating on the liquid surface of the cleaning water from the opening; and
   a glass ring that is provided within the cleaning tank and is fixed to the cleaning, tank by a fixture, the glass ring being disposed so that an edge of the liquid surface of the cleaning water contacts an inner circumferential surface of the glass ring.

2. The cleaning apparatus according to claim 1, wherein:
   the recovery device includes a removal member that removes the oil from the cleaning water and the oil recovered from the opening; and
   the cleaning water supply device supplies the cleaning water in which the oil is removed through the removal member to the cleaning tank.

3. The cleaning apparatus according to claim 2, further comprising:
   a holding member that holds the object to be cleaned when the object is immersed in the cleaning tank, wherein the holding member is formed of glass, or a surface of the holding member is coated with glass.

4. The cleaning apparatus according to claim 3, wherein the opening of the recovery device is disposed at the center of the cleaning tank when viewed from above.

5. The cleaning apparatus according to claim 4, wherein the oil is kerosene, and the cleaning water is warm water of about 40° C. or more.

6. The cleaning apparatus according to claim 3, wherein the oil is kerosene, and the cleaning water is warm water of about 40° C. or more.

7. The cleaning apparatus according to claim 2, wherein the opening of the recovery device is disposed at the center of the cleaning tank when viewed from above.

8. The cleaning apparatus according to claim 7, wherein the oil is kerosene, and the cleaning water is warm water of about 40° C. or more.

9. The cleaning apparatus according to claim 2, wherein the oil is kerosene, and the cleaning water is warm water of about 40° C. or more.

10. The cleaning apparatus according to claim 1, further comprising:

a holding member that holds the object to be cleaned when the object is immersed in the cleaning tank, wherein the holding member is formed of glass, or a surface of the holding member is coated with glass.

11. The cleaning apparatus according to claim 10, wherein the opening of the recovery device is disposed at the center of the cleaning tank when viewed from above.

12. The cleaning apparatus according to claim 11, wherein the oil is kerosene, and the cleaning water is warm water of about 40° C. or more.

13. The cleaning apparatus according to claim 10, wherein the oil is kerosene, and the cleaning water is warm water of about 40° C. or more.

14. The cleaning apparatus according to claim 1, wherein the opening of the recovery device is disposed at the center of the cleaning tank when viewed from above.

15. The cleaning apparatus according to claim 14, wherein the oil is kerosene, and the cleaning water is warm water of about 40° C. or more.

16. The cleaning apparatus according to claim 1, wherein the oil is kerosene, and the cleaning water is warm water of about 40° C. or more.

17. A cleaning method comprising:

immersing an object to be cleaned having stuck oil into the cleaning tank of the cleaning apparatus to which the cleaning water is supplied according to claim 1; and lifting the object to be cleaned from the cleaning tank after a predetermined time has elapsed.

18. A cleaning method comprising:

immersing an object to be cleaned having stuck oil into the cleaning tank of the cleaning apparatus to which the cleaning water is supplied according to claim 2; and lifting the object to be cleaned from the cleaning tank after a predetermined time has elapsed.

* * * * *